Oct. 7, 1941.  F. C. BIGGERT, JR  2,258,347
SHEAR
Filed March 16, 1940   3 Sheets-Sheet 2
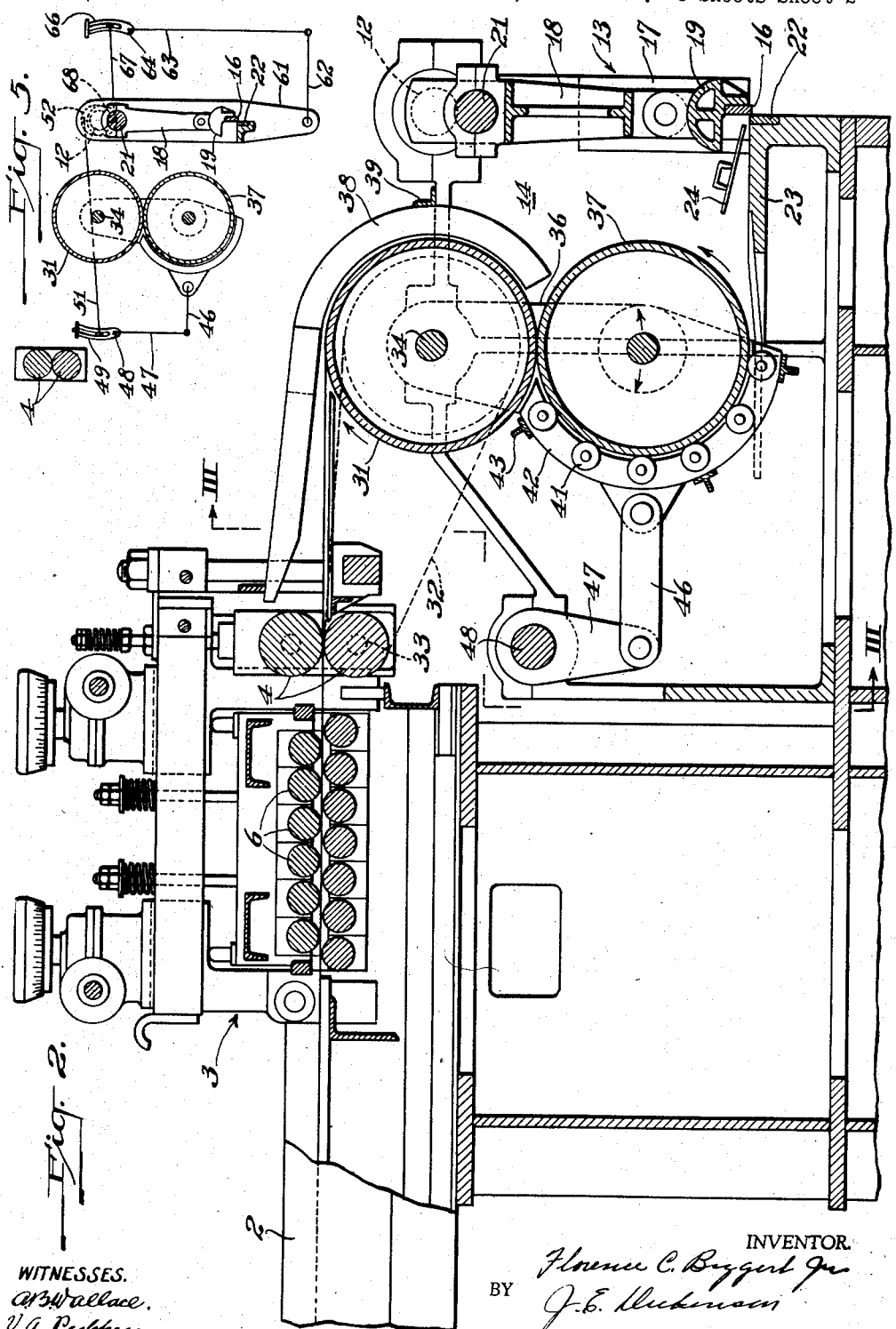

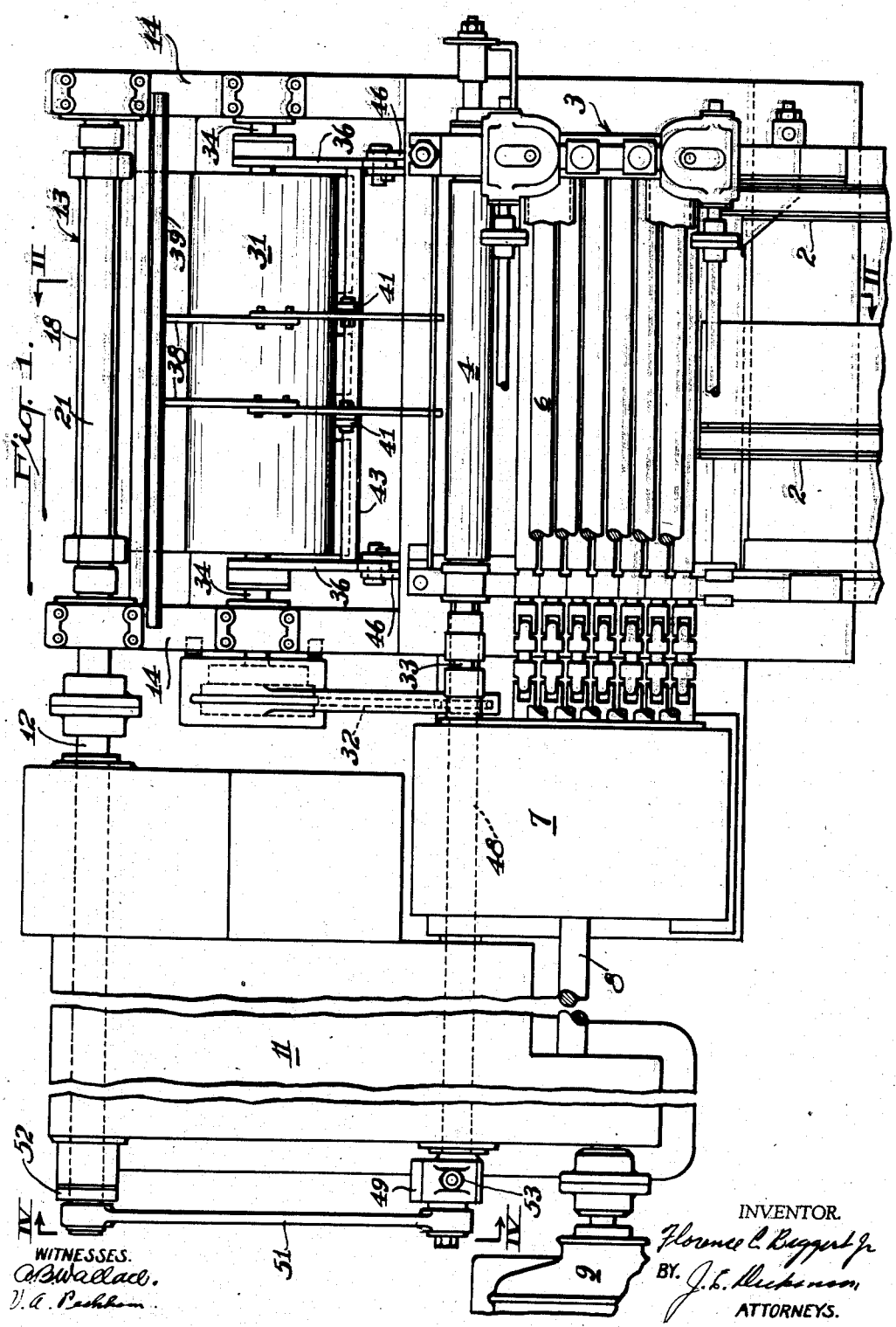

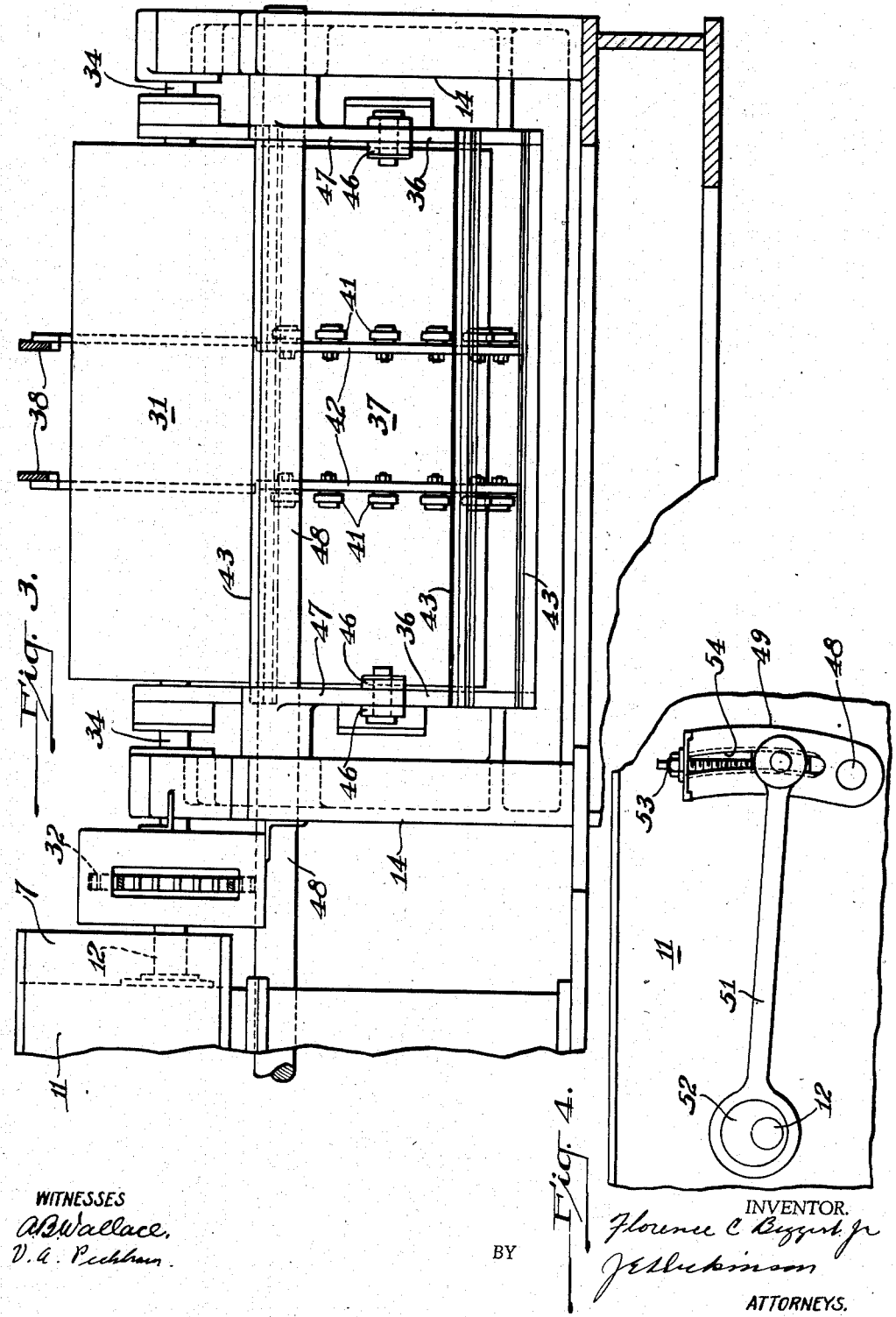

Patented Oct. 7, 1941

2,258,347

UNITED STATES PATENT OFFICE 2,258,347

SHEAR

Florence C. Biggert, Jr., Pittsburgh, Pa., assignor to United Engineering and Foundry Company, Pittsburgh, Pa.

Application March 16, 1940, Serial No. 324,334

11 Claims. (Cl. 164—49)

This invention relates to apparatus for shearing continuously advancing strip material into predetermined lengths, and more particularly to apparatus for retarding or stopping the portion of the strip in the shear at the time of the cut.

It is among the objects of this invention to provide apparatus which permits continuously moving strip to be cut into lengths by a shear that is stationary, or moving ahead more slowly than the strip is being fed, without objectionable buckling of the strip. Other objects are to provide apparatus of this character which is of relatively simple construction and which is adjustable to vary the speed at which the strip travels through the shear during the cut.

In accordance with this invention means is provided for engaging strip material being fed continuously to a shear and for lengthening its path of travel at the time it is being cut by the shear. This retards or stops the strip in the shear at that time so that it does not buckle. Preferably, this means comprises apparatus disposed between a shear and the strip feeding means for forming a loop in the strip. The looping apparatus includes a pair of rollers around and between which the strip passes in a circuitous or S-like path. Adjustable means is provided for effecting transverse movement of the rollers relative to each other during the shear cut to lengthen the path of travel of the strip at that time. In this way the velocity of the forward end of the strip is reduced momentarily, either partially so that a slowly operating flying shear can be used, or to the vanishing point when it is desired to use a fixed reciprocating shear. Preferably, one of the looper rollers is mounted above the other and the one closest the shear is so mounted that it can be swung away from the shear during a cut. While the distance that the strip must travel between the movable roller and the shear is thus being increased, the portion of the strip in the shear necessarily is retarded or stopped. That is, the movable roller may be moved away from the shear so fast that the strip will remain substantially motionless in the shear while being cut.

The invention is illustrated in the accompanying drawings, in which Fig. 1 is a plan view of my apparatus; Fig. 2 is an enlarged vertical section taken on the line II—II of Fig. 1; Fig. 3 is a transverse view taken on the line III—III of Fig. 2; Fig. 4 is a side view of the shaft oscillating means; and Fig. 5 is a diagrammatic view, similar to part of Fig. 2, of a modification of this invention.

Referring to Figs. 1 and 2 of the drawings, flexible strip material, such as metal strip, is delivered from an uncoiler (not shown) and between adjustable side guides 2 to a roller leveler 3 of conventional form. At the exit end of the leveler there is a pair of pinch rolls 4 which aid in feeding the strip forward. These rolls and the rollers 6 of the leveler are all driven continuously from a gear box 7 to which power is supplied through a shaft 8 from an electric motor 9.

This motor also drives continuously, through suitable gearing mounted in a gear housing 11, a shaft 12 that operates a shear 13 mounted between the front ends of upright side frames 14 extending forward from below the roller leveler. As shown in Fig. 2, this shear comprises a blade 16 that is moved up and down between vertical side guides 17 by a beam 18 pivoted to the top of the blade carrier 19 and journaled at its upper end on a crank shaft 21 which is journaled at its ends in side frames 14. One end of the crank shaft is connected to drive shaft 12 by which it is driven. The movable blade cuts against a stationary blade 22 extending along the front edge of a rearwardly projecting table 23 above which there is a plate 24 for guiding the strip between the shear blades.

It is a feature of this invention that improved means is provided for retarding or stopping advancement of the portion of the strip in the shear during each cut while the preceding portion of the strip is being continuously fed forward by the roller leveler and pinch rolls. Accordingly, a relatively large roller 31 is journaled in the top of side frames 14 between the leveler and shear and is driven by a chain and sprocket drive 32 (Fig. 1) from the shaft 33 that drives the lower pinch roll 4. Pivotally mounted on roller shafts 34 between the ends of the roller and the side frames are the upper ends of a pair of yoke arms 36 in the lower portions of which another large roller 37 is journaled in close proximity to the upper roller.

The strip that is fed forward from the pinch rolls passes over the top of upper roller 31 and is guided down around it into the pass between the two rollers by arcuate guide bars 38 rigidly connected to an angle iron 39 supported at its ends by side frames 14 in front of the upper roller. The strip passes backwardly between the large rollers and is then deflected downwardly and around the lower roller by means of guide rollers 41 carried by arcuate guide bars 42 supported by T-bars 43 which are rigidly connected at their ends to the yoke arms 36. From the bottom of lower roller 37 the strip travels forward across table 23 and through the shear.

To permit the strip between the shear blades to be stopped periodically so that a cut can be made through stationary material, but without stopping the roller leveler, the lower roller 37 is swung backwardly away from the shear at substantially half the speed as that at which the strip continues to be delivered from the leveler. Consequently, at one point in the rearward movement of the lower roller the loop of strip around it is moved backwardly away from the shear so fast that the portion of the strip between that roller and the shear can not move forward for a moment. It is at this moment, illustrated by the position of roller 37 in Fig. 2, that the shear severs the strip which is stationary between its blades. When the lower roller swings forward again the loop of strip around it is moved forward with it by guide rollers 41, whereby the portion of the strip that has left the bottom of roller 37 is pushed forward through the open shear at a higher speed than the strip is being advanced by the roller leveler.

To swing the lower roller 37 away from the shear for the purpose just described, the lower portions of the yoke arms 36 are pivotally connected by links 46 to the lower ends of a pair of levers 47 rigidly mounted on a shaft 48 journaled in the side frames 14. As shown in Figs. 1 and 3, this shaft extends below gear box 7 and parallel to the shear-driving shaft 12 to a point opposite its outer end and adjacent electric motor 9. Rigidly mounted on the outer end of shaft 48 is an upwardly extending lever 49 (Fig. 4) to which one end of a link 51 is pivotally connected. The opposite end of the link is pivotally connected to an eccentric 52 mounted on the end of shaft 12 whereby when the latter is rotated by the motor shaft 48 is oscillated, and through it lower roller 37 is swung back and forth with the yoke around the axis of the upper roller 31. To synchronize the oscillations of the lower roller with the shear so that the roller will be swinging backwardly at its greatest speed at the moment the sheads make a cut, link 51 is adjusted longitudinally of lever 49 in a well-known manner by a screw 53 that extends into a slot 54 with which the lever is provided.

With the apparatus as shown, the shear will cut the strip every time the lower roller 37 swings backwardly, but it can be made to miss one or more cuts periodically by connecting a miss-cut mechanism in the shear drive. Such a mechanism is well known in the art, and as it forms no part of this invention it need not be described further herein. Likewise, with the apparatus illustrated herein the plates that are cut from the strip will fall at the foot of the shear because they are substantially motionless at the time of cutting. However, it will be understood that the strip in the shear is not necessarily absolutely motionless throughout the time of the cut, but moving relative to the shear at a speed so slow as to cause only small and permissible buckling. Under some conditions of operation it is desirable that the strip continue its forward motion at a reduced rate during the cut, and this result may be accomplished by swinging the shear forward at the instant of cut at a predetermined speed while lower roller 37 swings backward. Whether the strip is stopped or merely has its speed reduced at the instant of cut the one condition necessary to successful operation remains the same; that is, the speed of the strip relative to that of the shear must be substantially zero during the cut.

A modification of the invention by which I may adapt it to shearing strip in motion at reduced speed is illustrated diagrammatically in Fig. 5 which shows only one of many ways by which this adaptation may be accomplished. As there shown, the upper reciprocating shear blade 16 and the lower fixed blade 22 are both mounted in a frame 61 that is pivotally mounted at its upper end on an axis coinciding with the axis of drive shaft 12 to form a flying shear. In order to swing the shear forward while the lower roller 37 is being swung backwardly, the shear is operably connected in some suitable manner with the roller oscillating means. One way in which this can be done is to pivotally connect a link 62 to the lower end of the shear frame and the lower end of a lever 63 extending downwardly from an oscillatable shaft 64. This shaft extends horizontally to the opposite end of the machine where it is provided with an upwardly extending lever 66. Adjustable vertically along this lever is a link 67 which is pivoted thereto and to an eccentric 68 mounted on shaft 12. Although eccentrics 52 and 68 are shown 180 degrees apart on shaft 12, it will be understood that this angular relation can be changed if desired.

With this construction lower roller 37 and shear frame 61 are swung toward and away from each other. The oscillations of the roller and shear frame can thus be synchronized so that the two will reach the lowest and fastest points of their arcs at approximately the same moment. When the apparatus is adjusted to increase the speed of the backward swing of roller 37, link 67 is adjusted along lever 66 to decrease the speed of the forward swing of the shear.

As stated previously this is only one method of adapting my invention to conditions requiring a velocity of the successively severed portions of strip greater than zero. It will be evident that any type of flying shear may be substituted for that shown without departing from the scope of my invention, provided only that the flying speed at which the cut is made be less than the constant feed velocity of the strip.

According to the provisions of the patent statutes, I have explained the principle and mode of operation of my invention, and have illustrated and described what I now consider to represent its best embodiment. However, I desire to have it understood that, within the scope of the appended claims, the invention may be practiced otherwise than as specifically illustrated and described.

I claim:
1. The combination with a shear and means for feeding strip material continuously thereto, of means comprising a pair of superposed rollers one of which is pivotally mounted for limited oscillatable movement about the other disposed between said feeding means and shear in engagement with the strip and forming a circuitous path of travel therefor, guide means partially encircling said pivotally mounted roller, and means for periodically moving said pivotally mounted roller of said strip-engaging means away from the shear to lengthen said path of travel while the strip is being cut by the shear into predetermined lengths.

2. The combination with a shear and means for feeding strip material continuously thereto, of means comprising a pair of superposed rollers one of which is pivotally mounted for limited oscillatable movement about the other for engaging the strip and adapted to lengthen its path of travel between said feeding means and shear at the time the strip is being cut by the shear, and means for moving the shear in the direction of travel of the strip at the same time that said path of travel is lengthened and at substantially the same speed at the time of the cut as the forward speed of the leading end of the strip at that time, whereby the strip in the shear at the time of the cut is substantially motionless relative to the shear.

3. The combination with a shear, means for feeding strip material continuously thereto, and means for moving the shear back and forth longitudinally of the strip passing through it, of strip-engaging means comprising a pair of superposed rollers, one of which is pivotally mounted for limited oscillation about the other, around and between which the strip is adapted to pass mounted for periodic movement to lengthen the path of travel of the strip between said feeding means and shear, and means synchronizing the movement of said strip-engaging means with the cutting and back and forth movements of the shear to cause the shear to move ahead and cut the strip when said path of travel is lengthened.

4. Looping apparatus for use between means for continuously advancing strip material and a shear for cutting the strip into predetermined lengths, comprising a roller over which the strip passes, arms pivoted at their upper ends at the opposite ends of said roller, a lower roller supported by the arms, said strip passing back between the rollers and forward from the bottom of the lower roller to the shear, and means for oscillating the arms to move the lower roller away from the shear during the cut.

5. Looping apparatus for use between means for continuously advancing strip material and a shear for cutting the strip into predetermined lengths, comprising a roller over which the strip passes, a yoke pivoted at its upper end on the axis of said roller, a lower roller supported by the yoke, said strip passing back between the rollers and forward from the bottom of the lower roller to the shear, means attached to the yoke for holding the strip against the lower roller, and means for oscillating the yoke to move the lower roller away from the shear during the cut at a speed no greater than half the speed at which the strip is advancing.

6. Looping apparatus for use between means for continuously advancing strip material and a shear for cutting the strip into predetermined lengths, comprising a roller over which the strip passes, a yoke pivoted at its upper end on the axis of said roller, a lower roller supported by the yoke, said strip passing back between the rollers and forward from the bottom of the lower roller to the shear, a lever spaced laterally from the lower roller, a link pivotally connected to the lever and yoke, and means for oscillating the lever whereby to move the lower roller away from the shear during the cut.

7. Looping apparatus for use between means for continuously advancing strip material and a shear for cutting the strip into predetermined lengths, comprising a pair of superposed rollers around and between which the strip passes to the shear, a rotating shaft for driving the shear, and means driven by said shaft for moving the forward roller away from the shear during the cut.

8. Looping apparatus for use between means for continuously advancing strip material and a shear for cutting the strip into predetermined lengths, comprising a roller over which the strip passes, a yoke pivoted at its upper end on the axis of said roller, a lower roller supported by the yoke, said strip passing back between the rollers and forward from the bottom of the lower roller to the shear, a rotating shaft for driving the shear, means driven by said shaft for oscillating the yoke to move the lower roller away from the shear during the cut, and means for varying the speed of said oscillation relative to the speed at which the strip advances.

9. Looping apparatus for use between means for continuously advancing strip material and a shear for cutting the strip into predetermined lengths, comprising a roller over which the strip passes, a yoke pivoted at its upper end on the axis of said roller, a lower roller supported by the yoke, said strip passing back between the rollers and forward from the bottom of the lower roller to the shear, a rotating shaft for driving the shear, a crank carried by said shaft, a second shaft, means operatively connecting the crank with said second shaft to oscillate the latter, and means operatively connecting said second shaft with said yoke, whereby the yoke is oscillated and the lower roller is moved periodically away from the shear during the cut.

10. Looping apparatus for use between means for continuously advancing strip material and a shear for cutting the strip into predetermined lengths, comprising a roller over which the strip passes, a yoke pivoted at its upper end on the axis of said roller, a lower roller supported by the yoke, said strip passing back between the rollers and forward from the bottom of the lower roller to the shear, a rotating shaft for driving the shear, a crank carried by said shaft, a second shaft, a lever rigidly connected to said second shaft, a link pivotally connected to the crank and lever, means for adjusting the link longitudinally of the lever, and means operatively connecting said second shaft with said yoke, whereby the yoke is oscillated and the lower roller is moved periodically away from the shear during the cut.

11. The combination with means for advancing strip material at a substantially constant velocity, of a flying shear adjusted to shear at a flying velocity less than said constant velocity, and strip-engaging means comprising a pair of superposed rollers one of which is pivotally mounted for limited oscillatable movement about the other adapted to substantially equalize the velocity of successive front end portions of the strip with said flying velocity of the shear while the shear is severing said end portions from the strip.

FLORENCE C. BIGGERT, Jr.